(12) United States Patent
Takashima et al.

(10) Patent No.: US 7,505,218 B2
(45) Date of Patent: Mar. 17, 2009

(54) LENS BARREL AND IMAGING APPARATUS

(75) Inventors: Masahiro Takashima, Hachioji (JP); Tougo Teramoto, Wakayama (JP); Shigeo Homme, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 5 days.

(21) Appl. No.: 11/584,611

(22) Filed: Oct. 23, 2006

(65) Prior Publication Data
US 2007/0091476 A1    Apr. 26, 2007

(30) Foreign Application Priority Data
Oct. 26, 2005  (JP) .............................. 2005-310985

(51) Int. Cl.
*G02B 7/02*    (2006.01)
(52) U.S. Cl. .................................... 359/822
(58) Field of Classification Search ................ 359/822, 359/676, 694, 811, 813, 819, 823, 826
See application file for complete search history.

(56) References Cited

U.S. PATENT DOCUMENTS

| 4,979,498 | A | * | 12/1990 | Oneda et al. ................. 600/118 |
| 5,932,984 | A | * | 8/1999 | Murakami et al. ........... 318/560 |
| 2003/0016454 | A1 | * | 1/2003 | Yamaguchi et al. .......... 359/819 |
| 2004/0095499 | A1 | * | 5/2004 | Ning ........................... 348/335 |
| 2004/0227845 | A1 | * | 11/2004 | Kawai .......................... 348/360 |
| 2006/0056079 | A1 | * | 3/2006 | Ishizuka et al. .............. 359/811 |

* cited by examiner

*Primary Examiner*—Scott J. Sugaman
*Assistant Examiner*—Mahidere S Sahle
(74) *Attorney, Agent, or Firm*—Finnegan, Henderson, Farabow, Garrett & Dunner, L.L.P.

(57) ABSTRACT

In a lens barrel in which an imaging optical system can be retracted and protruded, a retaining member to retain an optical element nearest to the imaging element among the imaging optical system is provided, the optical element moves in a receding direction from the imaging element when the imaging optical system is protruded, and moves in an approaching direction to the imaging element when the imaging optical system is retracted by deforming the retaining member.

8 Claims, 5 Drawing Sheets

LENS BARREL AND IMAGING APPARATUS

This application is based on Japanese Patent Application No. JP2005-310985 filed on Oct. 26, 2005 in Japanese Patent Office, the entire content of which is hereby incorporated by reference.

BACKGROUND OF THE INVENTION

The present invention relates to a retractable lens barrel and an imaging apparatus having the lens barrel thereof.

In recent years, replacing cameras using silver salt film, there have been popularly used electronic cameras wherein an imaging element carries out photo-electric conversion of light of a photographic subject, image data is obtained by applying a predetermined processing to an output from the imaging element and stored in a storage medium. In a field of the camera industry, to realize superior portability while not in use for photographing, cameras having so called a retractable lens barrel which is retracted to be thin by reducing distances between lens groups representing optical elements which configure an imaging optical system, are popular.

On the other hand, in an electronic camera using the imaging element, if dust exists in an imaging optical path near the imaging element, there is a problem that light for a light receiving element locating in the rear is interrupted and then a defect occurs in a photographic image.

To cope with this problem, there exist a camera in which dust is prevented from being adhering on surfaces between an imaging element side surface of a rearmost end lens group and a front surface of the imaging element by sealing the optical path between the rearmost end lens group and the imaging element, and a camera in which the rearmost end lens group and the imaging element are sealed and moved away from the imaging optical path and other imaging optical systems are moved backward. (For example: Refer to Patent document 1)

Patent Document 1: Japanese Unexamined Patent Application Open to Public Inspection No. H11-109203

The problem that the defect occurs on the photographic image caused by adhesion of even a smaller foreign matter on the optical path of the imaging element is becoming obtrusive in accordance with minimizing of pixels and reduction of pixel pitches between the pixels for a higher density pixel imaging element. Also, as a dust-adhering surface comes closer to the imaging element, the dust creates more problems even if it is small.

In recent years, the number of pixel of imaging element increases and the pixel pitch is condensed to some μm. In the structure in Patent document 1, to realize a condition where adhesion of dust does not affect the imaging element, a distance from the imaging element to the object side surface of rearmost end lens has to be extremely large. In this status, if the front lens groups are moved telescopically, it is difficult to retract the lens groups to be thin enough.

Also, as the aforesaid Patent Document 1, in case thin lens barrel at retraction is realized by moving sealed imaging element, optical filter and rearmost end lens outside the imaging optical path, when moving is repeated, it is difficult to make an imaging surface of the imaging element always perpendicular to the optical axis accurately. For example, when the imaging surface is tilted, there is occurred a problem that a partial blur occurs and an image maximizing an optical performance of the lens cannot be obtained.

SUMMARY OF THE INVENTION

The present invention has been achieved in view of the above problems, and an object of the present invention is to obtain a lens barrel and a imaging apparatus in which defects caused by the dust do not occur, the lens barrel is stored to be thin when it is retracted and an image maximizing optical performance of the imaging optical system is obtained.

The aforesaid problems can be solved by the following structures.

1) A lens barrel capable of retracting and protruding an imaging optical system having: an imaging optical system to conduct object light; an imaging element to carry out photo-electric conversion for the subject light conducted by the imaging optical system; wherein a deformable material covers a space between the imaging element and an optical element which is nearest to the imaging element among the imaging optical system, and the optical element moves in receding direction from the imaging element when the imaging optical system is being protruded and moves in an approaching direction to the imaging element when it is being retracted while maintaining the condition in which the deformable material covers the aforesaid space.

2) The lens barrel of 1), wherein the deformable material to cover the space between the imaging element and the optical element nearest to the imaging element among the imaging optical system has a bellows structure.

3) The lens barrel of 1), wherein the space between the imaging element and an optical element which is nearest to the imaging element among the imaging optical system is sealed.

4) The lens barrel of 1), wherein the space between the imaging element and the optical element nearest to the imaging element among the imaging optical system is communicated to outside through a filter.

5) The lens barrel of 1), wherein the optical element is an optical filter.

6) The lens barrel of 3) or 4), further comprising an air evacuating section to accept air in the space between the imaging element and the optical element.

7) An imaging apparatus, having the lens barrel of 1) to 6).

DETAILED DESCRIPTION OF THE PREFERRED EMBODIMENT

While the present invention is explained as follow referring to embodiments, the present invention is not limited the embodiments thereof.

Figure 1B:
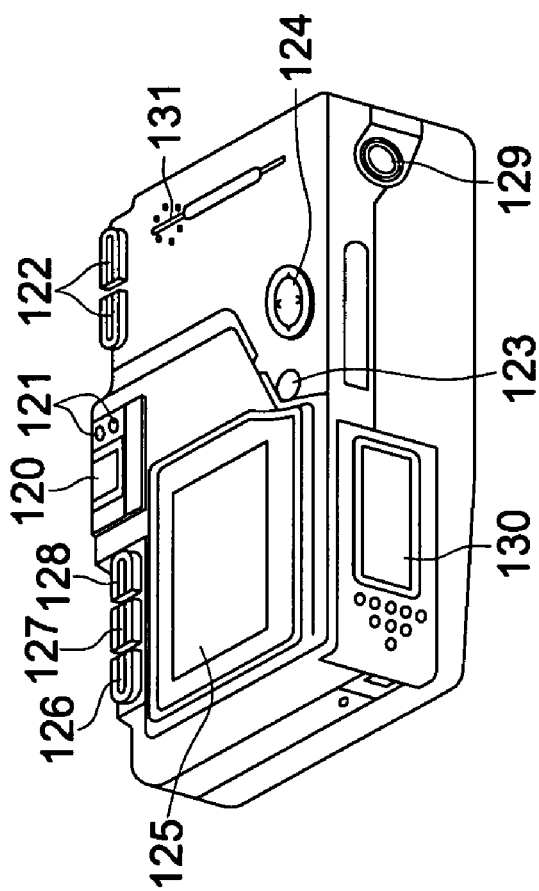
FIG. 1 is an external view of a camera representing an example of an imaging apparatus providing a lens barrel related to the present embodiment.
Figure 1A:
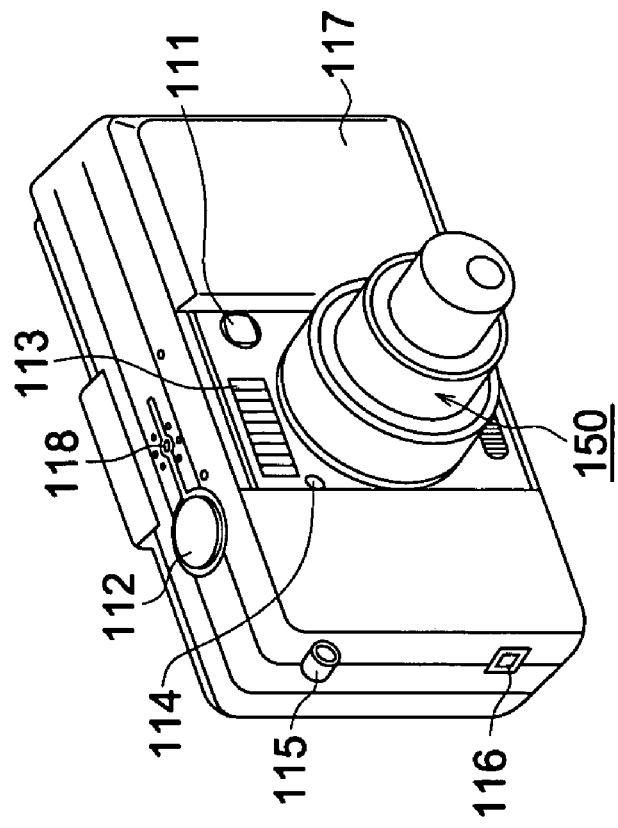

FIG. 1 is an external view of a camera representing an example of an imaging apparatus having a lens barrel related to the present embodiment. FIG. 1 (*a*) is a perspective view of a front surface of the camera and FIG. 1 (*b*) is a perspective view of a rear surface of the camera.

In FIG. 1 (*a*), numeral 150 represents a lens barrel having zooming imaging optical system inside. Numeral 111 represents a finder window, numeral 112 represents a release button, numeral 113 represents a flush light emitting section, numeral 114 represents a sensor window for light adjustment, numeral 115 represents a strap anchoring section and numeral 116 represents an external input/output terminal (for example, USB terminal). Numeral 117 represents a slide barrier and lens barrel 150 is retracted when slide barrier 117 is operated in a direction to close. Numeral 118 represents a microphone to record sound.

By pressing release button to a first stage, the camera is activated to be ready for imaging i.e. focusing and photometry, and to a second stage, photographing exposure is executed.

In FIG. 1 (*b*), numeral 120 presents a finder eye piece, numeral 121 represents red and green indication lamps which indicate information of AF and AE by blinking and by turning on for photographer. Numeral 122 represents a zooming button to zoom up and down. Numeral 123 represents a menu/set button, numeral 124 represents a selection button composed of a four-way switch and numeral 125 represents an image display section to display images and textural information. There is provided functions where various kinds of menu are displayed on image display section 125 by menu/set button 123, and are confirmed by menu/set button 123 after being selected by selection button 124. Numeral 126 represents a play button to replay images taken. Numeral 127 represents a display button to select deleting or selecting of the images and the textural information displayed on image display 125. Numeral 128 represents a delete button to delete the images taken and stored. Numeral 129 represents a tripod hole, numeral 130 represents a lid for a battery and a card, and numeral 131 represents a speaker for sound replay. Inside the battery/card lid 130, there are provided a battery to supply electric power to the camera, and a slot for the card where photographed images are stored. The battery and a card type recording medium are detachable.

Figure 2:
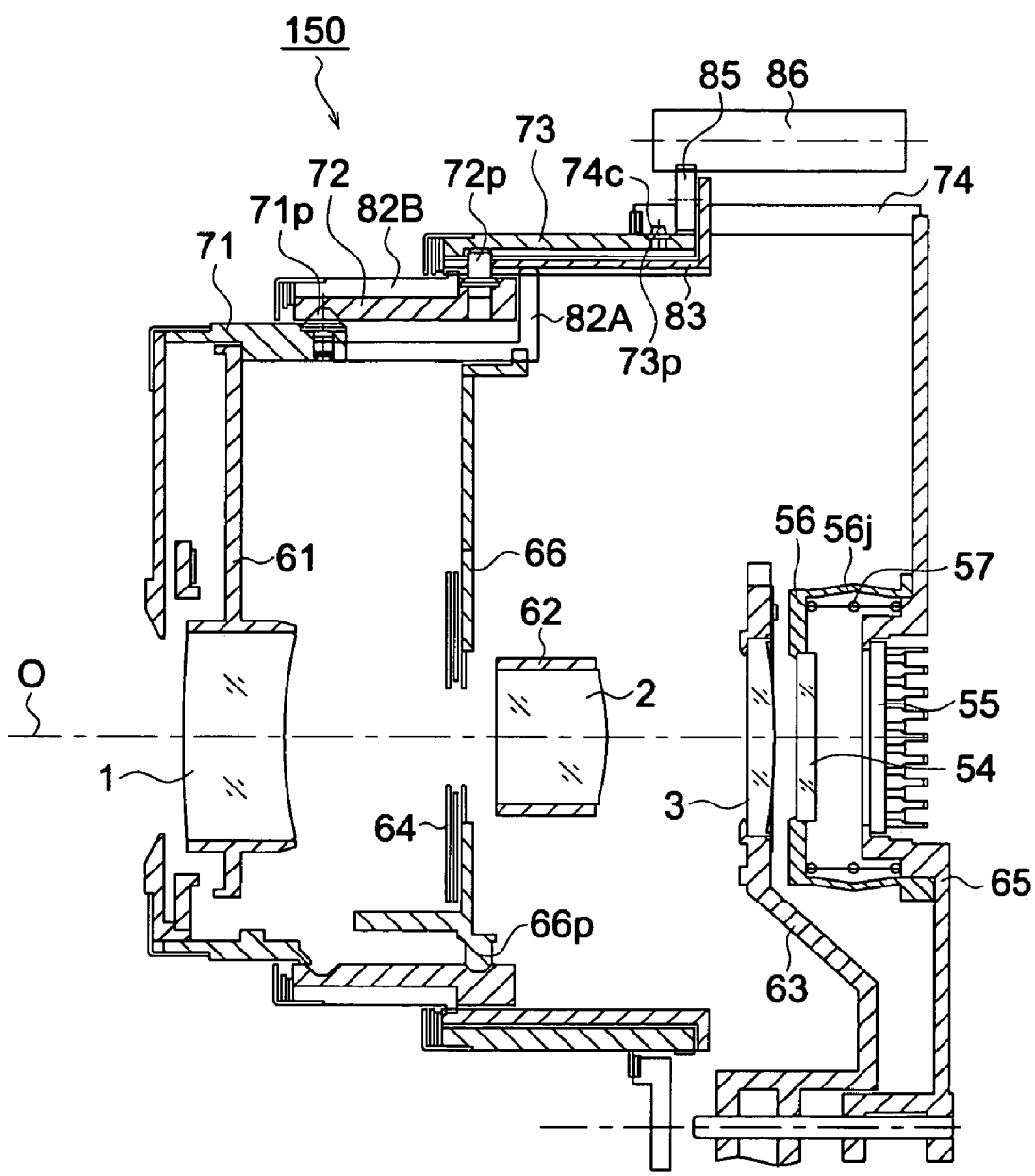
FIG. 2 is a schematic cross-sectional view of a lens barrel at wide status related to the present embodiment.

FIG. 2 is a schematic cross-sectional view of lens barrel 150 related to the present embodiment at wide angle. Meanwhile, in the figures blow, the same functional members are represented by the same symbols for explanation.

In FIG. 2, symbol O represents an optical axis, numerals 1, 2 and 3 represent a first lens group, a second lens group and a third lens group (first optical element) respectively, and numeral 54 represents an optical filter (second optical element) where infrared cutting filters and optical low pass filters are laminated. These configure an imaging optical system. Numeral 55 represents an image element.

Numeral 61 represents a first lens group frame to retain first lens group 1 and to be retained by front cylinder 71. Numeral 62 represents a second lens group frame to retain second lens group 2. Second lens group frame 62 is retained by second lens group moving frame 66 and is configured to be capable of moving out from optical axis O by swinging. Numeral 64 represents aperture/shutter unit retained by second lens group moving frame 66. Numeral 63 representing a third lens frame retains third lens group 3 and is configured to be able to move in a direction of optical axis O by an unillustrated stepping motor. Third lens group frame 63 can move independently thus focusing can be carried out by moving third lens group 3. Numeral 65 represents a base board to retain imaging element 55.

Optical filter 54 is retained by retaining member 56 which is of a deformable material. Retaining member 56 has bellows-shaped section 56*j* which is stretched by urging force of compression coil spring 57 arranged inside and is distant from the imaging element while imaging optical system-is protruded as FIG. 2 shows. Bellows-shaped 56*j* is composed of, for example, rubber material.

Next, action of lens barrel 150 is explained.

In FIG. 2, fixed barrel 74 is mounted onto base board 65. On the inner surface of the fixed barrel 74, there is formed cam groove 74*c* is formed. Numeral 73 represents an intermediate barrel which is rotated by an unillustrated motor, through intermediate barrel drive gear 85, a reduction gear train and column-shaped gear 86. Intermediate barrel 73 is moved by this rotation in the direction of optical axis O while cam pin 73*p* implanted in intermediated barrel 73 is guided by cam groove 74*c* formed on fixed barrel 74.

Guide ring 83 is engaged with a straight guide section formed on fixed barrel 74 to be capable of straight movement in the direction of optical axis O and moves straight in the optical axis direction O while maintaining intermediate barrel drive gear 85, in accordance with movement of intermediate barrel 73 in the direction of optical axis. On this guide ring 83, a cam groove and a straight guide section are formed.

In cam cylinder 72, there is implanted cam pin 72*p* which engages with intermediate barrel 73 and guide ring 83. Cam cylinder 72 rotates along with rotation of intermediated barrel 73 with which cam pin 72*p* engages, and moves in the direction of optical axis O while being guided by the cam groove formed on guide ring 83 with which cam pin 72*p* engages. Namely, cam pin 72*p* is engaged with a key way formed to be parallel with the optical axis of intermediate barrel 73 and with the cam groove formed on guide ring 83. On an inner surface of cam cylinder 72, there are formed cam grooves to guide front cylinder 71 and second lens group moving frame 66 respectively.

Straight guide 82A is engaged with a straight guide section formed on guide ring 83 to be able to move straight in the direction of optical axis O and moves straight in the direction of optical axis O in accordance with movement of cam cylinder 72 in the direction of optical axis O. Cosmetic cylinder 82B is also engaged with the straight guide section formed on guide ring 83 to be able to move straight, and moves straight in the direction of optical axis O in accordance with movement of cam cylinder 72 in the direction of optical axis.

Front cylinder 71 in which cam pin 71*p* to engage with one cam groove formed on cam cylinder 72 is implanted, is engaging with straight guide 82A. Also second lens group moving frame 66 in which cam pin 66*p* to engage with another cam groove formed on cam cylinder 72 is implanted, is engaging with straight guide 82A.

In this way, front cylinder 71 and second lens group moving frame 66 are moved straight in the direction of optical axis O by rotation of cam cylinder 72 being guided by the cam grooves engaged respectively, thus a distance between first lens group 1 retained by front cylinder 71 and second lens group 2 retained by second lens group moving frame 66 is changed so as to carry out zooming.

From this status, cam cylinder drive gear 85 is further driven to rotate intermediate barrel 73, and positions of first lens group and second lens group are changed by the cam groove formed on inner surface of cam cylinder 72 so as to carry out zooming.

The above is an outline of action of lens barrel 150.

Figure 3:
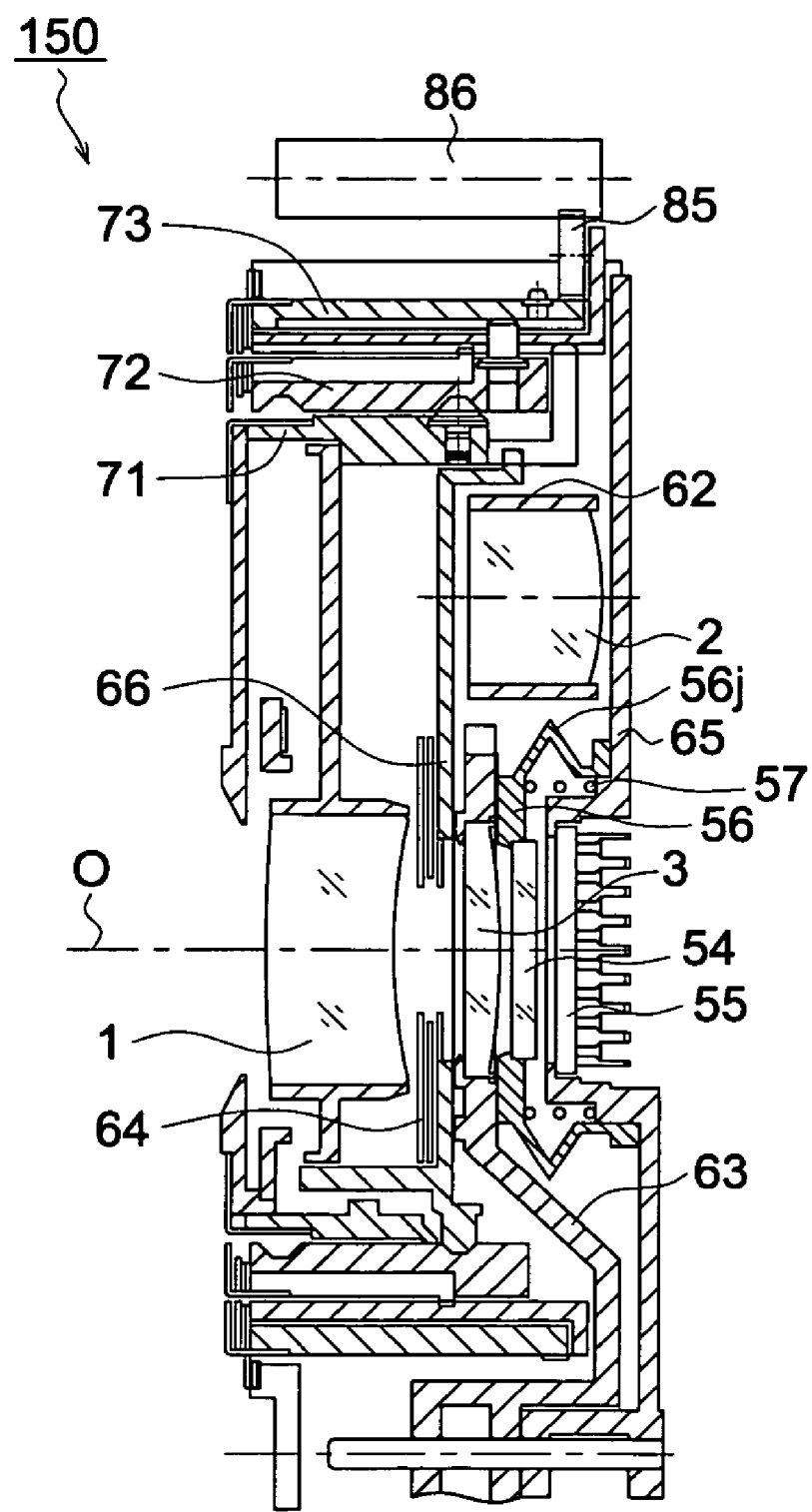
FIG. 3 is a schematic cross-sectional view of a lens barrel at retracted status related to the present embodiment.

FIG. 3 is a schematic cross-sectional view showing a retracted status of lens barrel 150 related to the present embodiment.

To realize the retracted status of lens barrel 150 shown by FIG. 3, intermediate barrel 73 is rotated reversely by rotating intermediate barrel drive gear 85 in reverse direction through reduction gear train column-shaped gear 86 by the unillustrated motor, after third lens group frame 63 is moved to base board 65 side from an wide status shown by FIG. 2.

By the reverse rotation of intermediate barrel 73, cam cylinder 72 is rotated reversely, then front cylinder 71 and second lens group moving frame 66 approach each other while being guided by cam grooves engaged respectively, and intermediate barrel 73 and cam cylinder 72 move to base board 65 side.

At this stage, second lens group frame 62 retained by second lens group moving frame 66 is rotatably supported by an unillustrated turning axis, and swings centering around the turning axis and moves away to a position different from the optical axis of other lens groups.

Intermediate barrel 73 and cam cylinder 72 move to base board 65 side and third lens group 3, second lens group moving frame 66, aperture and/or shutter unit 64 and first lens group 1 come close maintaining minimum distances to realize retraction status of FIG. 3.

In this status, retaining member 56 to retain optical filter 54 comes in contact with third lens group frame 63 as third lens group frame 63 moves in a direction towards imaging element 55 and bellows-shaped section 56j of retaining member 56 is folded against urging force of compression coil spring 57. Optical filter 54 moves to the direction of imaging element 55 to be close to imaging element 55 maintaining an allowable minimum clearance.

Meanwhile, since a space between optical filter 54 and imaging element 55 is sealed by optical filter 54, retaining member 56, imaging element 55 and base board 65, an air evacuating section to evacuate air in the space between optical filter 54 and imaging element 55 when retracting is provided. Thus, foreign maters from outside cannot enter.

That is, the lens barrel of the present embodiment is configured that optical filter 54 representing the optical element nearest to imaging element 55 is moved to be away greatly from imaging element 55 when the imaging optical system is protruded for photographing, and optical filter 54 comes close to imaging element 55 maintaining the allowable minimum clearance between optical filter 54 and imaging element 55 when the imaging optical system is retracted.

In the above method, since optical filter 54 is receded largely from imaging element 55, a photographed image is not affected by dust, even if dust adhere on third lens group 3 side surfaces of optical filter 54, and since optical filter 54 comes close to imaging element 55, the photographing optical system can be retracted thinly. Also, since imaging element 55 is fixed to the base board and not moved, tilting does not occur and a lens barrel where an image utilizing optical performance of lens is obtained is realized.

Meanwhile, while the explanation has been carried out by the embodiment where retaining member 56 and third lens group frame 63 recede each other when protruded, if stretchable amount of bellows-shaped section 56j of retaining member 56 is sufficient, retaining member 56 may come in contact with third lens group frame 63 and may follow movement of third lens group frame 63. In this way, occurrence of tilting of the optical element retained by retaining member 56 can be prevented.

Figure 4:
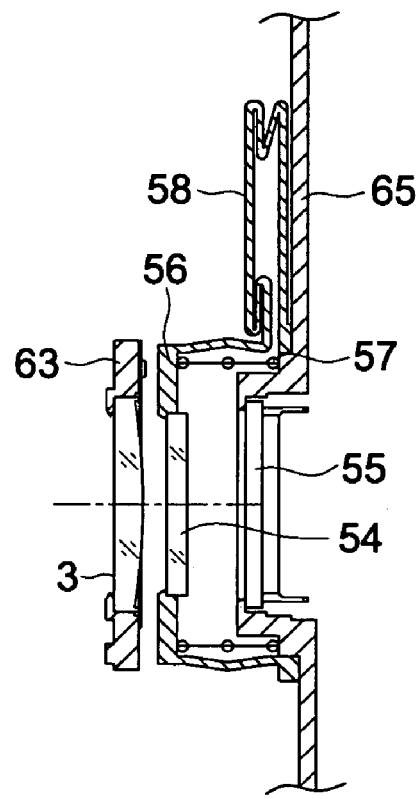
FIG. 4 is a schematic diagram of an example of a peripheral structure of a deformable retaining member.
Figure 4:
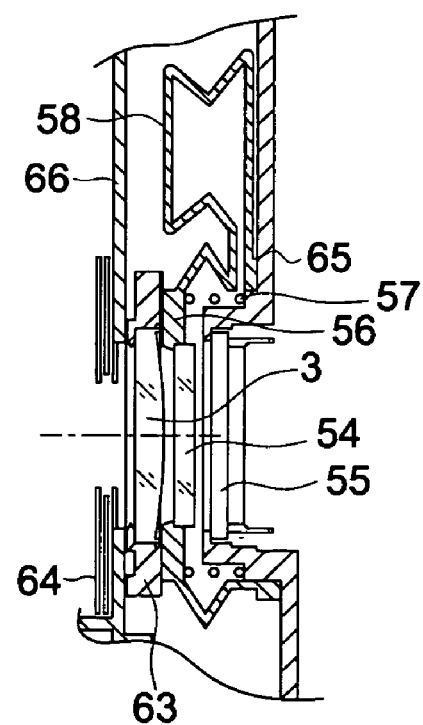

FIG. 4 is a schematic view of an example of peripheral structure of deformable retaining member 56. FIG. 4 shows a different cross-section from that in FIG. 2 and FIG. 3 and only periphery is extracted and schematically indicated. FIG. 4 (a) shows a status of retaining member 56 when an imaging optical system is protruded and FIG. 4 (b) shows that of retaining member 56 when retracted.

As FIG. 4 shows, a space between optical filter 54 and imaging element 55 is sealed by optical filter 54, retaining member 56, imaging element 55, base board 65 and retaining member 56. Further, an air evacuating section 58 to evacuate air in the space between optical filter 54 and imaging element 55 when retracting, is provided in a part of retaining member 56.

Thus, as FIG. 4(a) shows, in the status of extension at time of photographing, optical filter 54 recedes largely from imaging element 56 by urging force of compression coil spring 57. In is status, air in air evacuating section 58 flows into the space between imaging element 55 and optical filter 54.

Also, in a retracted status shown by FIG. 4 (b), retaining member 56 is pressed onto third lens group frame 63, then optical filter 54 and imaging element 55 come close each other maintaining allowable clearance. In this case, the air between imaging element 55 and optical filter 54 flows into air evacuating section 58.

In this way, by providing air evacuating section 58 to accept the air in the sealed space between optical filter 54 and imaging element 55 in case of retraction, even when the volume of the front space of imaging element 55 is changed, only air in sealed space moves and no external air flows in. Thus, in addition to the above effect, it is possible to prevent outside dust from sticking to the surface of filter 54 on the imaging element 55 side and to the front surface of imaging element 55 of the inside retaining member 56. Therefore, a lens barrel that causes images taken to be free from an influence of dust can be realized.

Figure 5:
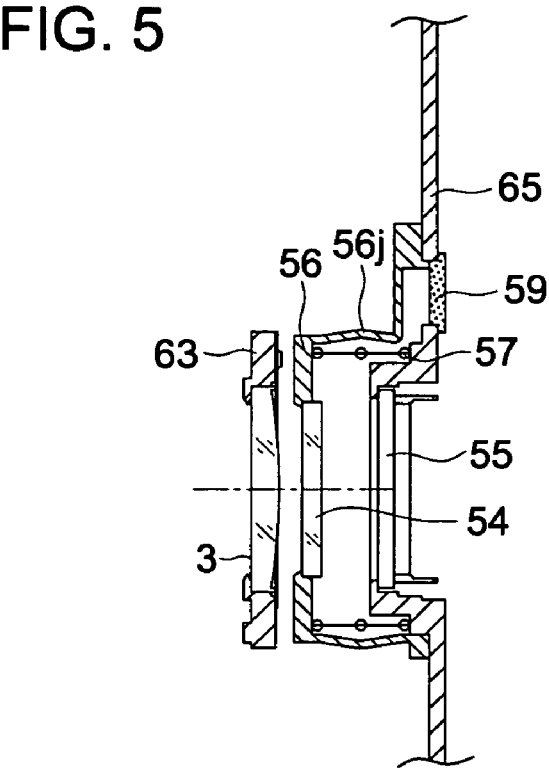
FIG. 5 is a schematic diagram of another example of a peripheral structure of a deformable retaining member.

FIG. 5 is a schematic view showing another example of a peripheral structure of deformable retaining member 56. FIG. 5 shows a status of retaining member 56 when imaging optical system is protruded. For FIG. 5, only portions different from the peripheral structure shown in FIG. 4 is explained.

Air in an internal space of retaining member 56 shown in FIG. 5 can flow in and out from and to outside through dust filter 59. Namely, when the retracting status changes to the extension status and bellows-shaped section 56j is stretched, outer air flows in through dust filter 59. On the other hand, when the extension status is changed to the retracting status, and bellow-shaped section 56j is contracted, inner air flows out through dust filter 59. As dust filter 59, a material (for example GOATEX™) which passes gases in the molecular state and does not pass dust more than some μm in size is preferred.

In this way, it can also prevent outside dust from suctioning and prevents imaging element 55 side surface of filter 54 and front surface of imaging element 55 from adhesion of the foreign maters, and a lens barrel in which dust cannot affect the photographed images can be realized.

Figure 6:
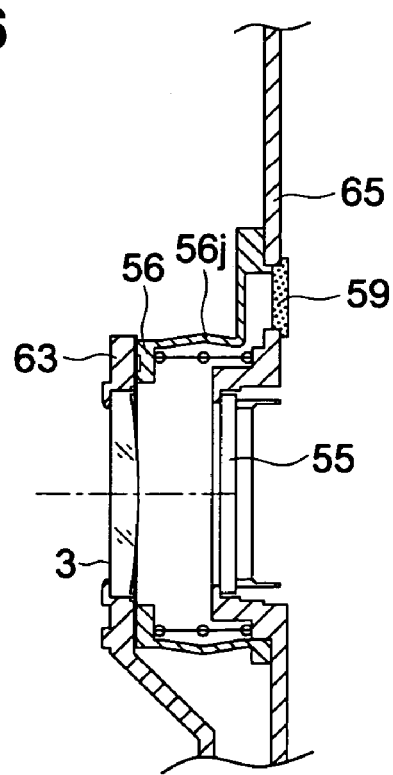
FIG. 6 is a schematic diagram of yet another example of a peripheral structure of a deformable retaining member.

FIG. 6 is a schematic view showing yet another example of a peripheral structure of deformable retaining member 56. FIG. 6 shows an example, wherein a space between a nearest lens to imaging element 55 within the imaging optical system and imaging element 55 is sealed by a deformable material.

As FIG. 6 shows, an object side end of deformable retaining material 56 is bonded with third lens group frame 63 retaining third lens group 3. When third lens group frame 63 moves, the space between imaging element 55 and third lens group 3 is covered by contracting of bellow-shaped section 56j. Also, the air in the space can flow in and out form and to outside.

In this way, in case a lens barrel having no optical filter, since third lens group 3 is receded largely from imaging element 55, a photographed image is not affected by dust, even if dust adhere on an object side surface of third lens group 3, and since third lens group 3 comes close to imaging element 55, the photographing optical system can be retracted thinly. Also, since imaging element 55 is fixed onto the base board and not moved, tilting does not occur and a lens barrel where an image utilizing optical performance of lens is obtained, is realized. Further since imaging element 55 side surface of third lens group 3 and front surface of imaging element 55 in retaining member 56 are prevented from adhesion of dust, a lens barrel where photographed images cannot be affected by dust is realized.

According to the present embodiments, a lens barrel and an imaging apparatus in which defects due to dust do not occur, the lens barrel is stored thinly when it is retracted and an image maximizing optical characteristics of the imaging optical system are obtained.

Meanwhile, in the embodiments in FIGS. 2 to 5, while examples in which the urging force of compression spring is used for moving have been explained, an embodiment in which other elastic member can be used and elasticity of a rubber can be used as it is.

Also, the imaging optical system including the optical filter is also called the imaging optical system.

What is claimed is:

1. A lens barrel comprising:
    an imaging optical system having a first optical element and a second optical element to conduct photographic subject light capable of being retracted and protruded;
    an imaging element to carry out photoelectric conversion of the photographic subject light conducted by the imaging optical system; and
    a deformable material to cover a space between the imaging element and the second optical element nearest to the imaging element among the imaging optical system;
    wherein the second optical element moves away from the imaging element when the imaging optical system is protruded to a photographing position and approaches to the imaging element when the imaging optical system is retracted and the second optical element moves independently from the first optical element and relatively to the imaging element while maintaining a state where the deformable material seals the space thereof.

2. The lens barrel of claim 1, wherein the deformable material to cover the space between the imaging element and the second optical element nearest to the imaging element among the imaging optical system has a bellows structure.

3. The lens barrel of claim 1, wherein the space between the imaging element and the second optical element nearest to the imaging element among the imaging optical system is sealed.

4. The lens barrel of claim 1, wherein the space between the imaging element and the second optical element nearest to the imaging element among the imaging optical system is communicated to outside through a filter.

5. The lens barrel of claim 1, wherein the second optical element is an optical filter.

6. The lens barrel of claim 3, further comprising an air accepting section to accept air in the space between the imaging element and the second optical element nearest to the imaging element among the imaging optical system.

7. An imaging apparatus, comprising the lens barrel of claim 1.

8. The lens barrel of claim 1, wherein the second optical element nearest to the imaging element is pushed by the first optical element and moves in a direction to approach to the imaging element when the imaging optical system is retracted.

* * * * *